(12) United States Patent
Xie

(10) Patent No.: US 11,706,394 B1
(45) Date of Patent: Jul. 18, 2023

(54) METHOD OF REAL-TIME VARIABLE REFRESH RATE VIDEO PROCESSING FOR AMBIENT LIGHT RENDERING AND SYSTEM USING THE SAME

(71) Applicant: Wenjun Xie, Shenzhen (CN)

(72) Inventor: Wenjun Xie, Shenzhen (CN)

( * ) Notice: Subject to any disclaimer, the term of this patent is extended or adjusted under 35 U.S.C. 154(b) by 0 days.

(21) Appl. No.: 17/864,513

(22) Filed: Jul. 14, 2022

(30) Foreign Application Priority Data

Jun. 17, 2022 (CN) .......................... 202210692007.9

(51) Int. Cl.
*H04N 9/64* (2023.01)
*H04N 7/01* (2006.01)

(52) U.S. Cl.
CPC ............. *H04N 9/64* (2013.01); *H04N 7/0127* (2013.01)

(58) Field of Classification Search
CPC ................................ H04N 9/64; H04N 7/0127
See application file for complete search history.

(56) References Cited

U.S. PATENT DOCUMENTS 7,859,554 B2 * 12/2010 Young ...................... G09G 5/02
345/204
2015/0029173 A1 * 1/2015 Nakata ..................... H04N 5/74
345/213

FOREIGN PATENT DOCUMENTS

CA 2798279 A1 * 6/2013 ........... H05B 47/155
WO WO-2007050399 A2 * 5/2007 ........... G03B 21/005

* cited by examiner

*Primary Examiner* — Antonio A Caschera
(74) *Attorney, Agent, or Firm* — Li & Cai Intellectual Property (USA) Office

(57) ABSTRACT

A method and a system of real-time variable refresh rate video processing for ambient light rendering, comprise: capturing a HDMI video signal and converting the HDMI video signal into a RGB signal; obtaining frame rates X1, X2, and X3 of a current video source by detecting a field frequency signal V-SYNC; setting a constant frame rate or a variable frame rate by user; setting the constant frame rate by the user and the constant frame rate is set as N, obtaining the constant frame rate N set by the user, outputting a color rendering data of the fixed frequency in real time through data processing; setting the variable frame rate by the user and the variable frame rate is set as M, obtaining the variable frame rate M set by the user, and outputting a color rendering data of a variable frequency in real time through the data processing.

9 Claims, 4 Drawing Sheets

METHOD OF REAL-TIME VARIABLE REFRESH RATE VIDEO PROCESSING FOR AMBIENT LIGHT RENDERING AND SYSTEM USING THE SAME

FIELD OF THE DISCLOSURE

The present disclosure relates to the technical field of video processing, in particular, to a method of real-time variable refresh rate video processing for ambient light rendering and a system using the same.

BACKGROUND OF THE DISCLOSURE

The synchronous video capture device can capture multiple color RGB signals of the video source in real time, and send each RGB signal to the corresponding intelligent ambient light synchronously to achieve the effect of enhancing the user experience.

At present, the traditional video synchronous acquisition lighting rendering system is mainly aimed at the video source with a fixed refresh rate, and sends the rendering data to the ambient light at a fixed acquisition frequency. With the development of technology, the technology in the field of e-sports—variable refresh rate (VRR) and high refresh rate (120 Hz/240 Hz) is gradually applied to the home display terminal TV. For the same video device, the refresh rate will change dynamically according to the video content itself. The current system or a fixed rendering frequency set by the system cannot match the refresh rate of the video source itself. In some scenes, the rendering lights may not keep up with the video, which reduces the user's sensory enjoyment.

SUMMARY OF THE DISCLOSURE

The purpose of the present disclosure is to provide a method of real-time variable refresh rate video processing for ambient light rendering and a system using the same to overcome the defects of the current technique.

The present disclosure is implemented by the following technical solutions: a method of real-time variable refresh rate video processing for ambient light rendering, comprising the following steps:

step 1: capturing a HDMI video signal and converting the HDMI video signal into a RGB signal;

step 2: obtaining frame rates X1, X2, and X3 of a current video source by detecting a field frequency signal V-SYNC, wherein X1, X2, and X3 are fixed frame rates or variable frame rates;

step 3: setting a constant frame rate or a variable frame rate by a user, wherein, when the user sets the constant frame rate, proceed to step 4, and when the user sets the variable frame rate, proceed to step 5;

step 4: setting the constant frame rate by the user and the constant frame rate is set as N, obtaining the constant frame rate N set by the user, and outputting a color rendering data of the fixed frequency in real time through data processing; and step 5: setting the variable frame rate by the user and the variable frame rate is set as M, obtaining the variable frame rate M set by the user, and outputting a color rendering data of a variable frequency in real time through the data processing.

Further, in step 4, the outputting the color rendering data of the fixed frequency in real time through data processing includes synthesizing collected field signals every Xn/N frame to obtain a frame data, and outputting a N frame signal to a rendering light system in a fixed field time, wherein the rendering light system performs rendering at a fixed N Hz refresh rate without being affected by a front-end source refresh rate.

Further, in step 5, the outputting the color rendering data of the variable frequency in real time through the data processing includes synthesizing collected field signals at every M frame to obtain a frame data, and outputting a Xn/M frame signal to a rendering light system in a fixed field time, wherein the rendering light system performs rendering according to a Xn/M Hz refresh rate, and changes in real time with a change of the front-end source refresh rate.

Further, in step 5, in the setting the variable frame rate by the user and the variable frame rate is set as M, M includes a fast mode, a medium mode, and a slow mode.

The present disclosure further provides a system of real-time variable refresh rate video processing for ambient light rendering, comprising:

a HDMI signal output module configured to output two HDMI signal data;

a HDMI signal conversion module configured to convert and output the HDMI signal data into RGB signal data, and obtain the frame rates X1, X2, X3 of a current video source by detecting a field frequency signal V-SYNC, wherein X1, X2, and X3 are fixed frame rates or variable frame rates; and a data processing module configured to output color rendering data of fixed frequency in real time through data processing when a user sets a constant frame rate, and output color rendering data of variable frequency in real time through data processing when the user sets a variable frame rate.

Further, the color rendering data of the fixed frequency output by the data processing module in real time through the data processing is to synthesize collected field signals every Xn/N frame to obtain a frame data, and in a fixed field time, a N frame signal is output to a rendering light system, wherein the rendering light system performs rendering at a fixed N Hz refresh rate without being affected by a front-end source refresh rate.

Further, the color rendering data of the variable frequency output by the data processing module in real time through the data processing is to synthesize collected field signals at every Xn/N frame to obtain a frame data, and in a fixed field time, a M frame signal is output to a rendering light system, wherein the rendering light system performs rendering according to a Xn/M Hz refresh rate, and changes in real time with a change of the front-end source refresh rate.

Further, the HDMI signal conversion module is an HDMI conversion chip.

Further, the data processing module is MCU or FPGA.

Advantages of the present disclosure are as follows.

The present disclosure mainly collects the RGB signal output by the HDMI conversion chip, analyzes the V-SYNC according to the signal, and uses different algorithms to match the user needs for rendering effects, including constant refresh rate and variable refresh rate, to ensure that the rendering effect is consistent with user needs, and the subjective experience of user in different scenarios is enriched. For example, if user chooses a constant refresh rate when watching a movie, the effect of the ambient light will be smoothed; if user chooses a variable refresh rate when playing a game, the dynamic change of the ambient light will be faster, and user can get a good sense of immersion.

BRIEF DESCRIPTION OF THE DRAWINGS

In order to explain the embodiments of the present disclosure or the technical solutions in the prior art more clearly, the following briefly introduces the accompanying drawings that need to be used in the description of the embodiments or the prior art. Obviously, the drawings in the following description are only are some embodiments of the present disclosure. For those of ordinary skill in the art, other drawings can also be obtained from these drawings without creative efforts.

DETAILED DESCRIPTION OF THE EXEMPLARY EMBODIMENTS

The technical solutions in the embodiments of the present disclosure will be clearly and completely described below with reference to the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative efforts shall fall within the protection scope of the present disclosure.

Figure 1:
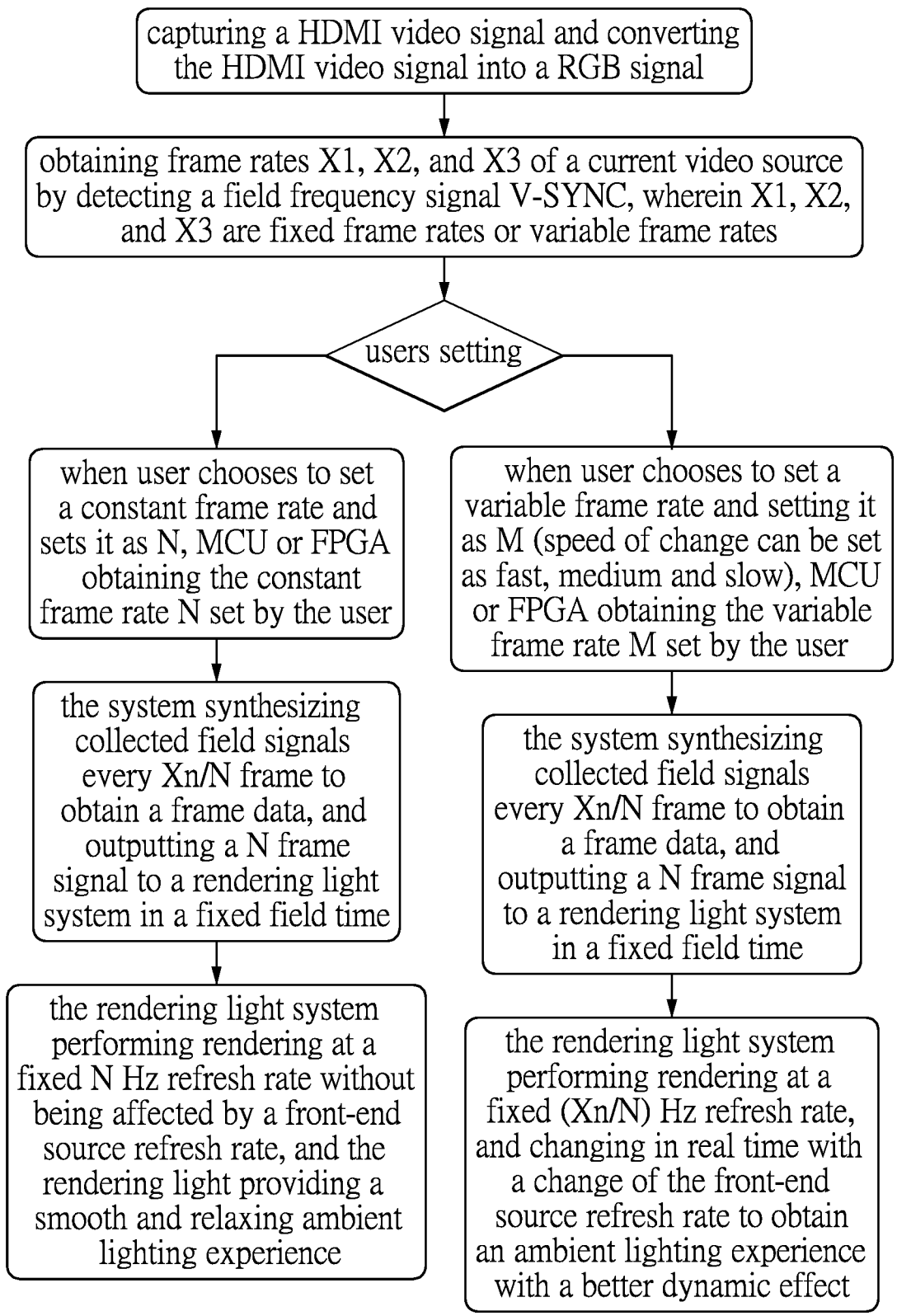
FIG. 1 is a flowchart of a method of real-time variable refresh rate video processing for ambient light rendering according to an embodiment of the present disclosure.

As shown in FIG. 1, a method of real-time variable refresh rate video processing for ambient light rendering, comprising the following steps:

step 1: capturing a HDMI video signal and converting the HDMI video signal into a RGB signal;

step 2: obtaining frame rates X1, X2, and X3 of a current video source by detecting a field frequency signal V-SYNC, wherein X1, X2, and X3 are fixed frame rates or variable frame rates;

step 3: setting a constant frame rate or a variable frame rate by a user, wherein, when the user sets the constant frame rate, proceed to step 4, and when the user sets the variable frame rate, proceed to step 5;

step 4: setting the constant frame rate by the user and the constant frame rate is set as N, obtaining the constant frame rate N set by the user, and outputting a color rendering data of the fixed frequency in real time through data processing; and step 5: setting the variable frame rate by the user and the variable frame rate is set as M, obtaining the variable frame rate M set by the user, and outputting a color rendering data of a variable frequency in real time through the data processing.

Figure 4:
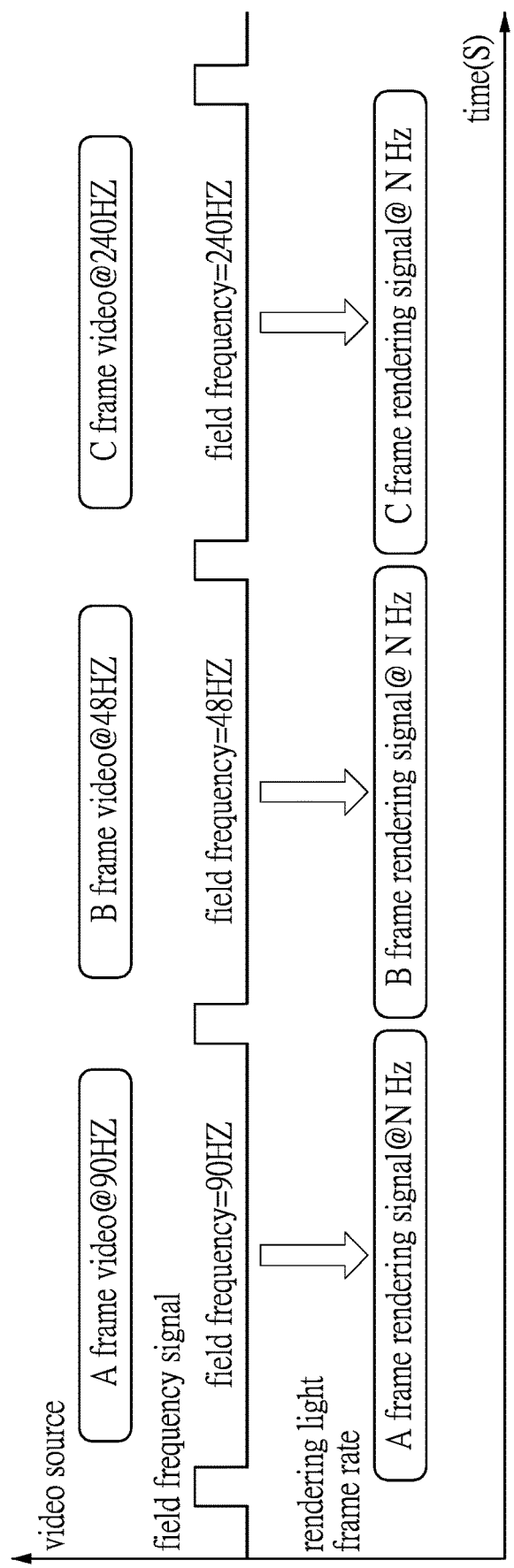
FIG. 4 is a flow chart of constant refresh rate signal processing of a method of real-time variable refresh rate video processing for ambient light rendering according to an embodiment of the present disclosure.

In this embodiment, in step 4, the outputting the color rendering data of the fixed frequency in real time through data processing includes synthesizing collected field signals every Xn/N frame to obtain a frame data, and outputting a N frame signal to a rendering light system in a fixed field time, wherein the rendering light system performs rendering at a fixed N Hz refresh rate without being affected by a front-end source refresh rate. For example, when the video refresh frame rate of the front-end is fixed at X Hz, the system can set the refresh frame rate of the rendering lights to N (1≤N≤5), and the actual rendering frame rate is N Hz, and the system renders by extracting one frame data every (X/N) frames. When the front-end video source supports functions such as Freesync or G-sync, the output signal source will have a real-time frame rate change, such as the frame rate change range is X1 Hz—X2 Hz. At this time, the system can set the refresh rate of the rendering light to N (1≤N≤5), and the actual rendering frame rate is N Hz, and the system renders by extracting a frame data every (X1/N)—(X2/N) frame. As shown in FIG. 4, it is a flow chart of constant refresh rate signal processing, and the frame rates of the output rendering lights are all N Hz.

Figure 3:
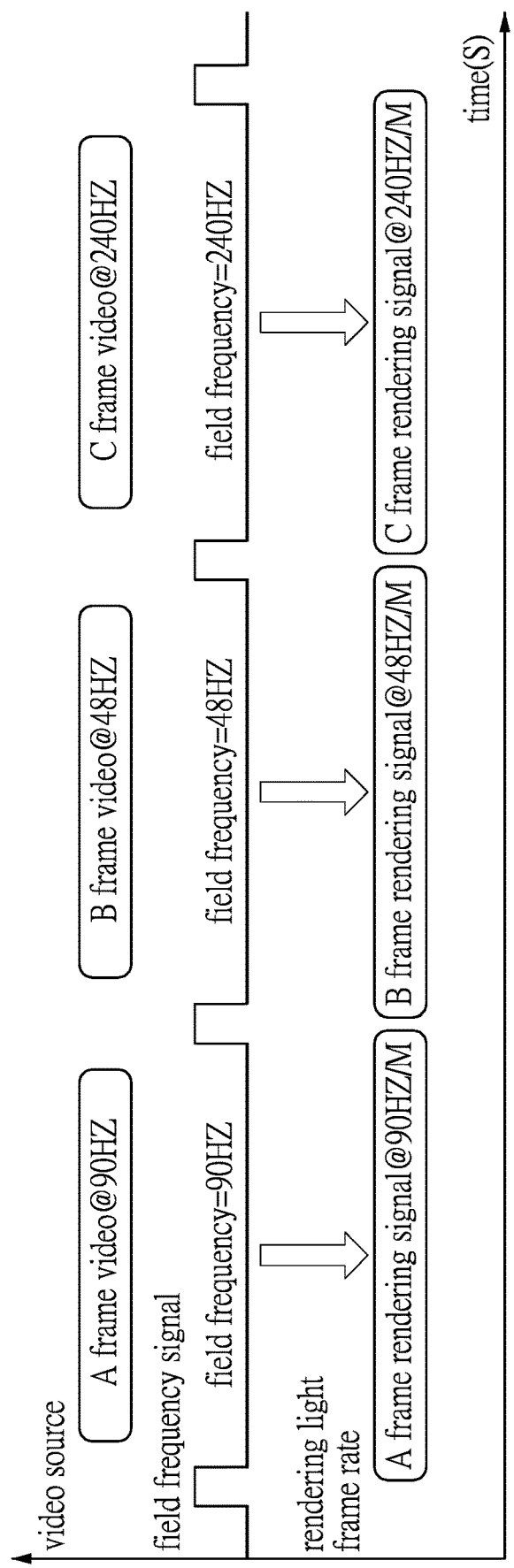
FIG. 3 is a flowchart of variable refresh rate signal processing of a method of real-time variable refresh rate video processing for ambient light rendering according to an embodiment of the present disclosure.

In this embodiment, in step 5, the outputting the color rendering data of the variable frequency in real time through the data processing includes synthesizing collected field signals at every M frame to obtain a frame data, and outputting a Xn/M frame signal to a rendering light system in a fixed field time, wherein the rendering light system performs rendering according to a Xn/M Hz refresh rate, and changes in real time with a change of the front-end source refresh rate. For example, when the frame rate of the video source at the front end is fixed at X Hz, the system can set the frame rate of the rendering lights to M (1≤M≤5), and the actual rendering frame rate is (X/M) Hz, and the system renders by extracting one frame data every M frames. When the front-end video source supports Freesync or G-sync functions, the frame rate of the output signal source will change in real time, such as the frame rate change range is X1 Hz—X2 Hz. At this time, the system can set the frame rate of the rendering light to M (1≤M≤5), and the actual rendering frame rate is (X1/M) Hz—(X2/M) Hz, the system renders by extracting a frame data every M frame. As shown in FIG. 3, it is a flow chart of variable refresh rate signal processing, and the output rendering light frame rates are 90 HZ/M, 48 HZ/M, and 240 HZ/M respectively.

In this embodiment, in step 5, in the setting the variable frame rate by the user and the variable frame rate is set as M, M includes a fast mode, a medium mode, and a slow mode.

Figure 2:
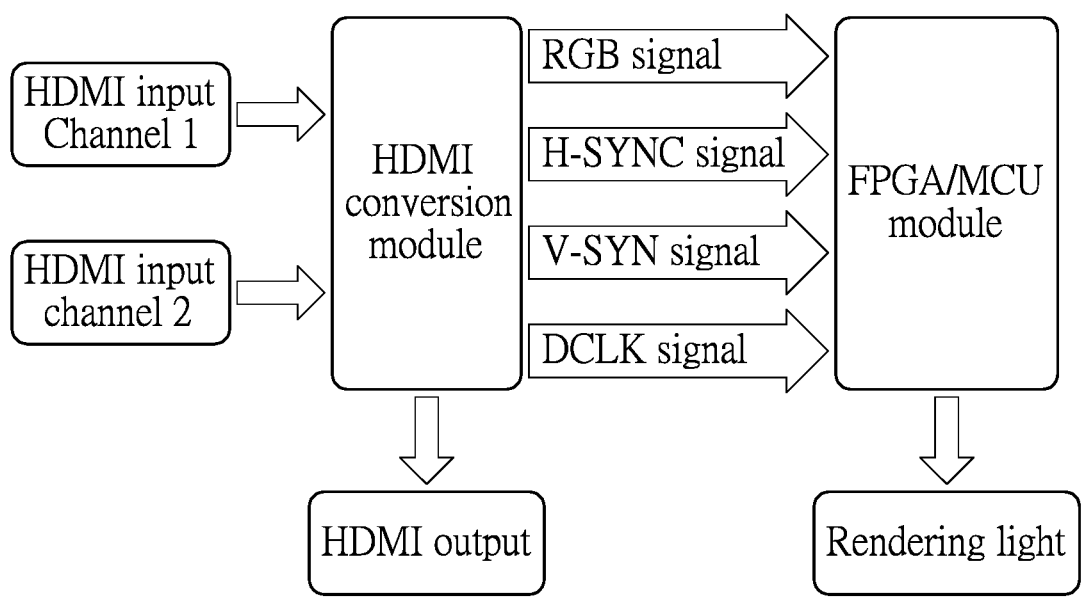
FIG. 2 is a schematic block diagram of a method of real-time variable refresh rate video processing for ambient light rendering according to an embodiment of the present disclosure.

As shown in FIG. 2, the present disclosure further provides a system of real-time variable refresh rate video processing for ambient light rendering, comprising:

a HDMI signal output module configured to output two HDMI signal data;

a HDMI signal conversion module configured to convert and output the HDMI signal data into RGB signal data, and obtain the frame rates X1, X2, X3 of a current video source by detecting a field frequency signal V-SYNC, wherein X1, X2, and X3 are fixed frame rates or variable frame rates; and a data processing module configured to output color rendering data of fixed frequency in real time through data processing when a user sets a constant frame rate, and output color rendering data of variable frequency in real time through data processing when the user sets a variable frame rate.

As shown in FIG. 2, the clock is used to identify the resolution of the current video. Only by detecting the corresponding resolution, the video can be processed. The specific process is as follows.

1. detecting the current clock DCLK to confirm the resolution of the video signal;
2. starting collecting the RGB signal, and organizing the data according to the corresponding resolution. For example, if the resolution is 1080 P, the format of each frame signal collected is 1920*1080;
3. H-sync representing the line frequency, which represents the data acquisition cycle of each frame, and V-sync representing the field frequency, which represents the frame rate per second; that is the refresh rate mentioned here;
4. FPGA or MCU collecting each frame of front-end data according to the clock signal, H-sync, V-sync, and storing it in the internal storage area; and
5. doing some calculations on these data, and then using them for ambient lighting rendering according to the needs of the back-end (such as the constant refresh rate or variable refresh rate set by the customer).

Fixed frequency and variable frequency can be determined by different algorithms, which can be determined by end user according to their own needs. The difference between them is that: no matter how the signal refresh rate of the constant refresh rate front-end changes, the rendering light uses a constant refresh rate; the variable refresh rate is that the rendering light completely follows the refresh rate of the front-end signal source (by a fixed frequency reduction factor N).

In this embodiment, the color rendering data of the variable frequency output by the data processing module in real time through the data processing is to synthesize collected field signals at every Xn/N frame to obtain a frame data, and in a fixed field time, a M frame signal is output to a rendering light system, wherein the rendering light system performs rendering according to a Xn/M Hz refresh rate, and changes in real time with a change of the front-end source refresh rate. For example, when the video refresh frame rate of the front-end is fixed at X Hz, the system can set the refresh frame rate of the rendering lights to N (1≤N≤5), and the actual rendering frame rate is N Hz, and the system renders by extracting one frame data every (X/N) frame. When the front-end video source supports functions such as Freesync or G-sync, the output signal source will have a real-time frame rate change, such as the frame rate change range is X1 Hz—X2 Hz. At this time, the system can set the refresh rate of the rendering light to N (1≤N≤5), and the actual rendering frame rate is N Hz, and the system renders by extracting a frame data every (X1/N)—(X2/N) frame. As shown in FIG. 4, it is a flow chart of constant refresh rate signal processing, and the frame rate of the output rendering lights is N Hz. After the user sets it to N HZ, after algorithm processing, it outputs a frame every (X1/N), for example, if the user sets it to 10 HZ, when the refresh rate of the source is 60 HZ (by detecting V-sync), the MCU will output one frame data every (60/10) frame. If the user sets N=20, the system will output a frame of rendering data every (60/20) frame. If the front-end refresh rate is changed from 60 HZ to 120 HZ, the back-end refresh rate is still 20 HZ, but the system will output another frame data every (120/20) frame, that is to say, no matter how the frame rate of the front-end signal source changes, the refresh rate of the back-end rendering lights remains N=20.

In this embodiment, the data processing module outputs the color rendering data with variable frequency in real time after data processing. Specifically, the collected field signals are synthesized every M frames to obtain a frame of data, and within a fixed field time, output Xn/The M frame signal is sent to the rendering light system; the rendering light system performs rendering according to the Xn/M Hz refresh rate, and changes in real time with the change of the front-end source refresh rate. For example, when the frame rate of the video source at the front end is fixed at X Hz, the system can set the frame rate of the rendering lights to M (1≤M≤5), and the actual rendering frame rate is (X/M) Hz, and the system renders by extracting one frame data every M frame. When the front-end video source supports Freesync or G-sync functions, the frame rate of the output signal source will change in real time such as the frame rate change range is X1 Hz—X2 Hz. At this time, the system can set the frame rate of the rendering light to M (1≤M≤5), and the actual rendering frame rate is (X1/M) Hz—(X2/M) Hz, and the system renders by extracting a frame data every M frame. As shown in FIG. 3, it is a flow chart of variable refresh rate signal processing, and the output rendering light frame rates are 90 HZ/M, 48 HZ/M, and 240 HZ/M respectively.

The frame rate reduction of the variable refresh rate is a configurable parameter. In fact, it is to compress the collected data according to a fixed ratio. For example, if a 60 HZ signal is collected, after 1/6 compression, only 10 HZ rendering data is output, and the data of 6 frames is added to each pixel, and then divided by 6 to get an average value. The mathematical expression is $P=(p1+p2+p3+p4+p5+p6)/6$. Since the function of the rendering light is to set off an atmosphere and make the video of the TV and monitor have an enlarged effect, the rendering light does not need to change too sharply, so the collected video signal is down-converted before rendering the light. A slowly changing foil effect can be achieved. However, each user has different requirements for the refresh rate of the rendering lights. For example, some game players will hope that the change of the ambient light will be faster in order to keep up with the rhythm of the game scene switching. Therefore, the present disclosure provides a variable refresh rate setting, allowing users to decide the refresh rate of the rendering lights according to their own needs.

The practical significance of the present disclosure lies in that: with the increasing number of home audio-visual equipment, home theaters and e-sports have higher and higher requirements for immersive presentation, and the products of audio and video rendering lamps are also more and more abundant. With the increasing number of video terminals that support VRR (variable refresh rate), the requirements for synchronous rendering lights are getting higher and higher. At present, the products on the market are facing the scene of fixed refresh rate and variable refresh rate. Generally, a fixed refresh rate is set through the mobile APP to meet the customer's requirements for the rendering refresh rate.

1. If the connection is with a fixed refresh rate, such as an ordinary video box, the refresh rate is generally 50/60 HZ, at this time, the user adjusts the rendering speed according to the changes of the scene, and the speed can be set to "Medium".
2. If the connection is a device with a variable refresh rate, such as PS5, XBOX and other professional game consoles, due to the dynamic change of the refresh rate from 48-120 HZ, user generally sets the rendering speed to "fast".

However, due to the same video device, the refresh rate will change dynamically according to the video content itself, so setting a fixed rendering frequency through the APP cannot correspond to the refresh rate of the video source itself, and the rendering lights may not keep up in some scenes. In the case of video, the user's sensory enjoyment is reduced.

The present disclosure mainly collects the RGB signal output by the HDMI conversion chip, analyzes the V-SYNC according to the signal, and uses different algorithms to match the user needs for rendering effects, including constant refresh rate and variable refresh rate, to ensure that the rendering effect is consistent with the user needs, and the subjective experience of user in different scenarios is enriched. For example, if user chooses a constant refresh rate when watching a movie, the effect of the ambient light will be smoothed; if user chooses a variable refresh rate when playing a game, the dynamic change of the ambient light will be faster, and user can get a good sense of immersion.

The above descriptions are only preferred embodiments of the present disclosure, and are not intended to limit the present disclosure. Any modification, equivalent replacement, improvement, etc. made within the spirit and principle of the present disclosure shall be included within the protection scope of the present disclosure.

What is claimed is:

1. A method of real-time variable refresh rate video processing for ambient light rendering, comprising the following steps:
    capturing a HDMI video signal and converting the HDMI video signal into a RGB signal;
    obtaining frame rates of a current video source by detecting a field frequency signal, wherein the frame rates are fixed frame rates or variable frame rates;
    setting a constant frame rate or a variable frame rate by a user;
    when the user sets the constant frame rate, obtaining the constant frame rate set by the user, and outputting a color rendering data of the fixed frequency in real time through data processing; and
    when the user sets the variable frame rate, obtaining the variable frame rate set by the user, and outputting a color rendering data of a variable frequency in real time through the data processing.

2. The method according to claim 1, wherein, when the user sets the constant frame rate, the outputting the color rendering data of the fixed frequency in real time through data processing includes synthesizing collected field signals every Xn/N frame to obtain a frame data, where Xn is the frame rates and N is the constant frame rate, and outputting a N frame signal to a rendering light system in a fixed field time, wherein the rendering light system performs rendering at a fixed N Hz refresh rate without being affected by a front-end source refresh rate.

3. The method according to claim 1, wherein, when the user sets the variable frame rate, the outputting the color rendering data of the variable frequency in real time through the data processing includes synthesizing collected field signals at every M frame to obtain a frame data, and outputting a Xn/M frame signal to a rendering light system in a fixed field time, where Xn is the frame rates and M is the variable frame rate, wherein the rendering light system performs rendering according to a Xn/M Hz refresh rate, and changes in real time with a change of the front-end source refresh rate.

4. The method according to claim 1, wherein, when the user sets the variable frame rate, in the setting the variable frame rate by the user and the variable frame rate is set as M, M includes a fast mode, a medium mode, and a slow mode.

5. A system of real-time variable refresh rate video processing for ambient light rendering, comprising:
    a HDMI signal output module configured to output a plurality of HDMI signal data;
    a HDMI signal conversion module configured to convert and output each of the HDMI signal data into RGB signal data, and obtain frame rates of a current video source by detecting a field frequency signal, wherein the frame rates are fixed frame rates or variable frame rates; and
    a data processing module configured to output color rendering data of fixed frequency in real time through data processing when a user sets a constant frame rate, and output color rendering data of variable frequency in real time through data processing when the user sets a variable frame rate.

6. The system according to claim 5, wherein the color rendering data of the fixed frequency output by the data processing module in real time through the data processing is to synthesize collected field signals every Xn/N frame to obtain a frame data, where Xn is the frame rates and N is the constant frame rate, and in a fixed field time, a N frame signal is output to a rendering light system, wherein the rendering light system performs rendering at a fixed N Hz refresh rate without being affected by a front-end source refresh rate.

7. The system according to claim 5, wherein the color rendering data of the variable frequency output by the data processing module in real time through the data processing is to synthesize collected field signals at every Xn/N frame to obtain a frame data, where Xn is the frame rates and N is the constant frame rate, and in a fixed field time, a M frame signal is output to a rendering light system, wherein the rendering light system performs rendering according to a Xn/M Hz refresh rate, where M is the variable frame rate, and changes in real time with a change of the front-end source refresh rate.

8. The system according to claim 5, wherein the HDMI signal conversion module is an HDMI conversion chip.

9. The system according to claim 5, wherein the data processing module is MCU or FPGA.

* * * * *